Feb. 9, 1937. F. W. YOUNG 2,070,074
APPARATUS FOR DISCHARGING FILTERS
Filed Sept. 24, 1934
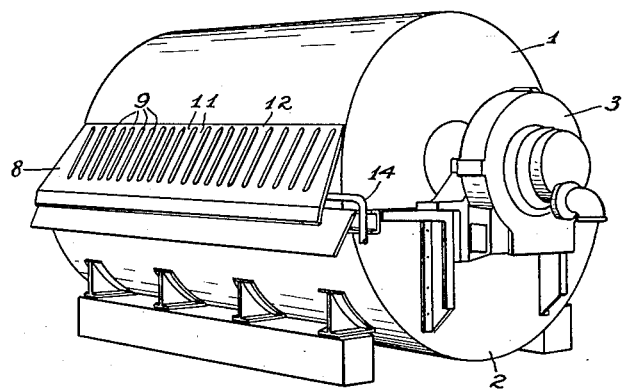
Fig-1.
Fig-2.
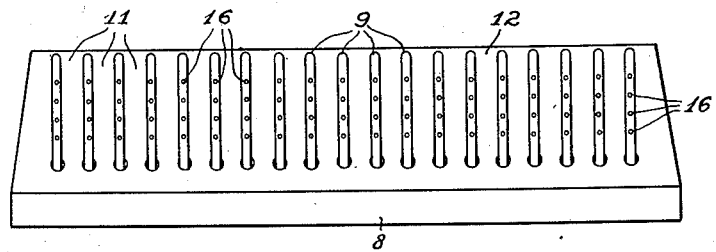
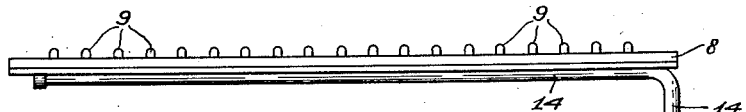
Fig-3.
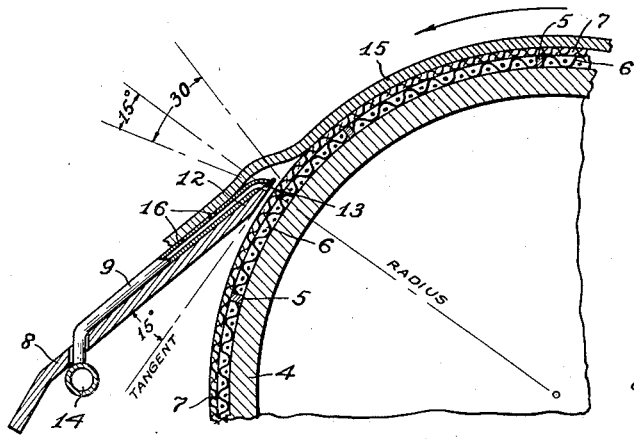
Fig-4.
INVENTOR.
FRANK W. YOUNG
BY
ATTORNEY Patented Feb. 9, 1937

2,070,074

UNITED STATES PATENT OFFICE 2,070,074

APPARATUS FOR DISCHARGING FILTERS

Frank W. Young, Upper Montclair, N. J., assignor by mesne assignments, to Oliver United Filters Incorporated, San Francisco, Calif., a corporation of Nevada Application September 24, 1934, Serial No. 745,205

8 Claims. (Cl. 210—201)

This invention relates to a method and apparatus for discharging filters and in particular to a method and apparatus for discharging continuous filters of the rotary drum type.

The method and apparatus used for discharging cakes formed on filters depends of course upon the physical characteristics of the cake. Some cakes are granular or crystalline, others are fibrous and still others are slimy. A doctor or scraper is suitable for some materials while for others a discharge roll is required and in still other cases the cake has been stripped or cut from the filter medium by the use of a current of air or other fluid. With each of these methods of discharging the well known blowback or reverse pressure can be used. This invention pertains to still another method of accomplishing this general result.

In general the object of the invention is the provision of a method and apparatus for discharging a filter cake from a continuous filter whereby a current of air is made to pass inwardly through the filter medium in advance of the point of discharge and then reflected, by means beneath the filter medium, upwardly therethrough against the lower face of the advancing cake.

Another object of the invention is the provision of means whereby the cake after being dislodged from the filter medium may be air floated over the surface of a modified doctor or scraper.

The invention possesses other advantageous features, some of which with the foregoing, will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is a perspective view of a rotary drum filter in which the objects of the invention are embodied.

Figure 2 is a plan view of a modified doctor or scraper as shown in connection with Figure 1.

Figure 3 is an elevation of the doctor or scraper as shown in Figure 2.

Figure 4 is a fragmentary section of the filter drum and its associated doctor taken at right angles to the axis of the drum.

As shown in Figure 1 the objects of the invention can be conveniently embodied in a rotary drum filter of standard construction and which may comprise a sectionalized drum 1 rotatively disposed within a filtrant tank 2 and provided with the usual automatic valve 3 by means of which the sections of the filter may be successively subjected to a differential pressure. The drum may comprise a shell 4 provided with spaced longitudinally disposed division strips 5 within which are secured supporting members or screens 6 (see Fig. 4). A filter medium 7 of any suitable type is secured over the division strips 5 and over the supporting screens thereby forming individual shallow compartments 1 which as above stated may be successively subjected to a differential pressure by means of the automatic valve 3 as it rotates within the filtrant tank.

Extending across the face of the drum 1 and secured to the tank 2 by any suitable means is a plate 8 similar to that used as doctors or scrapers. Secured over the upper face of the plate 8 is a plurality of spaced parallel tubes or pipes 9 the adjacent members of which form channels 11 and the inner ends of which pass downwardly through the inner end 12 of the plate 8 and terminate in nozzles 13. These nozzles may be formed either as an integral part of the pipes 9 or as a part of the inner end 12 of the plate 8 as best shown in Figure 4. The outer ends of the pipes 9 communicate with a manifold or header 14 which in turn may be connected to any suitable source of fluid under pressure such as air. The nozzles 13 should be so formed and adjusted as to direct fluid streams inwardly through the filter medium as shown in Figure 4 so that these streams may be reflected outwardly through the filter medium by the shell 4 of the drum to a point slightly in advance of the inner end 12 of the plate 8. When this condition prevails it will be seen that the reflected streams passing outwardly through the filter medium impinge upon the lower face of the filter cake 15 as it advances with the filter medium and thereby serve to dislodge or strip the cake therefrom. The nozzles 13 should be so adjusted that the maximum amount of air can be passed inwardly through the filter medium and reflected upwardly and outwardly therethrough in advance of the inner end of the plate 8. A maximum quantity of air or other fluid may be made to pass inwardly through the filter medium if the nozzles are directed along the radius of the drum, that is perpendicularly to the filter medium, but it has been found that under these conditions there will be little or none of the air reflected upwardly through the filter medium. On the other hand if the nozzles are adjusted so as to direct the air at too great an angle with the radius little or no air will pass inwardly through the filter medium. It will therefore be seen that the angle at which the nozzles 13 should be directed with respect to the filter medium is somewhat critical and it has been found that the plate 8 should preferably lie at an angle of 15° with the tangent and that the nozzles 13 should direct the fluid streams at an angle of 15° to the filter medium. Under these conditions the angle between the incident and reflected streams will of course be 30° and will be sufficient to permit the reflected streams to clear the inner end 12 of the plate 8 and to impinge upon the lower face of the cake.

After the fluid streams have impinged upon the lower face of the cake 15 and have served to strip or dislodge the cake from the filter medium, their only way of escape is outwardly through the channels 11 defined by the pipes 9, and in passing outwardly through these channels these streams have a tendency to float or support the cake 15 as it passes downwardly over the pipes 9. For the purpose of enhancing this floating action the pipes 8 may be provided with small holes 16 as shown in Figures 2 and 4.

Although the invention has been illustrated with particular reference to a continuous filter of the rotary drum type it can nevertheless be applied to any filter or similar equipment wherein a sheet of material is carried on a foraminous screen which has relative motion with respect to a discharging mechanism such as above described.

I claim:

1. In combination with a rotary drum filter: a doctor, a nozzle associated with the inner edge of said doctor for directing a stream of fluid downwardly through the filter medium and means beneath the filter medium for reflecting said stream upwardly through the filter medium in advance of the inner edge of the doctor.

2. In combination with a rotary drum filter, a doctor, a nozzle associated with the inner edge of said doctor for directing a stream of fluid downwardly through the filter medium, means beneath the filter medium for reflecting said stream upwardly through the filter medium in advance of the inner edge of the doctor and channels formed on the upper face of the doctor through which said reflected fluid may pass beneath the cake as the cake travels over the doctor.

3. In combination with a rotary drum filter: a doctor, a plurality of nozzles associated with the inner edge of said doctor for directing fluid streams downwardly through the filter medium and means beneath the filter medium for reflecting said stream upwardly through the filter medium in advance of the inner edge of the doctor.

4. In combination with a rotary drum filter: a doctor comprising a plate extending across the face of the drum, a nozzle associated with the inner edge of said plate for directing a stream of fluid downwardly through the filter medium and means beneath the filter medium for reflecting said stream upwardly through the filter medium in advance of the inner edge of said plate.

5. In combination with a rotary drum filter: a doctor comprising a plate extending across the face of the drum, a nozzle associated with the inner edge of said plate for directing a fluid stream downwardly through the medium, means beneath the filter medium for reflecting said stream upwardly through the filter medium in advance of the inner edge of said plate so as to lift the filter cake formed on the drum as it approaches the doctor and channels provided on the upper face of said plate through which said reflected fluid may pass beneath the cake as the cake travels over the doctor.

6. In combination with a rotary drum filter: a doctor comprising a plate extending across the face of the drum, a plurality of spaced parallel pipes transversely disposed over the upper face of said plate and terminating in nozzles extending downwardly through said plate for directing fluid streams downwardly through the filter medium and means beneath the filter medium for reflecting said fluid streams upwardly therethrough in advance of the inner edge of said plate.

7. In combination with a rotary drum filter: a doctor disposed adjacent the discharge side of the drum and provided on its upper surface with spaced parallel pipes forming channels; and nozzles associated with the lower inner edge of said doctor communicating with said pipes and directed at an angle of substantially 15° to the filter medium.

8. In combination with a sectionalized rotary drum filter wherein each section is provided with a floor substantially parallel with the filter medium carried by the drum: a doctor disposed adjacent the discharge side of the drum and provided on its upper surface with spaced, parallel pipes forming intermediate channels; and nozzles associated with the lower inner edge of said doctor communicating with said pipes and directed at an angle of substantially 15° to the filter medium.

FRANK W. YOUNG.